(12) United States Patent
Hovey et al.

(10) Patent No.: US 10,863,843 B1
(45) Date of Patent: Dec. 15, 2020

(54) EYEWEAR STORAGE DEVICE

(71) Applicants: William Hovey, Rockaway, NJ (US); Patricia Hovey, Rockaway, NJ (US)

(72) Inventors: William Hovey, Rockaway, NJ (US); Patricia Hovey, Rockaway, NJ (US)

(73) Assignee: Patricia Hovey, Rockaway, NJ (US)

( * ) Notice: Subject to any disclaimer, the term of this patent is extended or adjusted under 35 U.S.C. 154(b) by 0 days.

(21) Appl. No.: 16/579,177

(22) Filed: Sep. 23, 2019

(51) Int. Cl.
*A47F 5/00* (2006.01)
*A47G 29/08* (2006.01)
*A47F 7/02* (2006.01)
*B60R 7/08* (2006.01)

(52) U.S. Cl.
CPC .............. *A47G 29/08* (2013.01); *A47F 7/021* (2013.01); *B60R 7/082* (2013.01)

(58) Field of Classification Search
CPC ............ A45C 11/04; A45C 11/24; A45F 5/02
See application file for complete search history.

(56) References Cited

U.S. PATENT DOCUMENTS

| D161,151 | S | * | 12/1950 | Ackerman et al. ............ D3/265 |
| 7,553,018 | B1 | * | 6/2009 | Riazi .......................... A45F 5/02 |
| | | | | 24/3.3 |
| 8,136,780 | B2 | * | 3/2012 | Lin ......................... F16M 11/28 |
| | | | | 248/316.4 |
| 8,469,325 | B2 | * | 6/2013 | Yu ........................... G10G 5/005 |
| | | | | 248/231.51 |
| 10,222,633 | B2 | * | 3/2019 | Blum ..................... G02C 11/10 |

* cited by examiner

*Primary Examiner* — Amy J. Sterling
(74) *Attorney, Agent, or Firm* — Patentfile, LLC; Bradley C. Fach; Steven R. Kick (57) ABSTRACT

An eyewear storage device may include a receptacle which may be coupled to a receiver. The receptacle may comprise a cavity for receiving portions of an article of eyewear. The receiver may comprise a first arm which may be movably coupled to a second arm. The first arm may have a first finger, and the first finger may have a first finger gripping surface. The second arm may have a base, and the base may have a base gripping surface. The first finger gripping surface and the base gripping surface may be movable towards and away from each other. Preferably, the first finger gripping surface and the base gripping surface may be positioned on opposing sides or surfaces of an object, such as a cell phone, and the first arm and the second arm may contact and tension against opposing sides of the object to grip the object.

19 Claims, 8 Drawing Sheets

EYEWEAR STORAGE DEVICE

FIELD OF THE INVENTION

This patent specification relates to the field of devices configured to receive eyewear, such as vision correcting eyeglasses. More specifically, this patent specification relates to a device configured to store eyewear and to secure the eyewear to other objects.

BACKGROUND

Eyewear, such as vision correcting eyeglasses, sunglasses, safety glasses, etc., are used by many people for vision correcting purposes and for one or more specific activities, such as for reading and operating electronic devices, such as smartphones, computers, and the like. Unfortunately, it is very common for people to lose and misplace their eyewear. It is another all too common occurrence for people to intentionally leave their eyewear behind because they do not foresee a safe and reliable way to bring their eyewear when traveling. For these reasons, many people that need or could benefit from eyewear must make do without.

Therefore, a need exists for novel devices configured to store eyewear, such as vision correcting eyeglasses, sunglasses, safety glasses, etc. A further need exists for novel devices for storing eyewear that are able to prevent users from losing and misplacing their eyewear. There is also a need for novel devices for storing eyewear that are able to provide a safe and reliable way to bring eyewear when the user is traveling.

BRIEF SUMMARY OF THE INVENTION

An eyewear storage device is provided. In some embodiments, the device may include a receptacle which may be coupled to a receiver. The receptacle may comprise a cavity for receiving portions of an article of eyewear, such as vision correcting eyeglasses, sunglasses, safety glasses, and any other vision correcting or enhancing device. The receiver may comprise a first arm which may be coupled to a second arm. The first arm may have a first finger, and the first finger may have a first finger gripping surface. The second arm may have a base, and the base may have a base gripping surface. The first arm may be movably coupled to the second arm so that the first finger gripping surface and the base gripping surface may be movable towards and away from each other. Preferably, the first finger gripping surface and the base gripping surface may be positioned on opposing sides or surfaces of an object, such as a cell phone, and the first arm and the second arm may be moved towards each other so that the first finger gripping surface and the base gripping surface are contacting and tensioned against the opposing sides or surfaces of the object so that the receiver may grip the object. In this manner the receptacle that is coupled to the receiver may be coupled to the object so a user may use the cavity to removably secure an article of eyewear to the object. The opposing surface of base gripping surface may be angled to provide a supporting stand configuration for the object to rest in a viewing position when placed on its base.

In further embodiments, the first arm may further include a second finger having a second finger gripping surface which may also be configured to contact portions of an object.

In further embodiments, the receiver may include a plurality of teeth, and the positioning of the first finger gripping surface relative to the base gripping surface may be governed by the positioning of the teeth between one or more plate retainers on the second arm.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
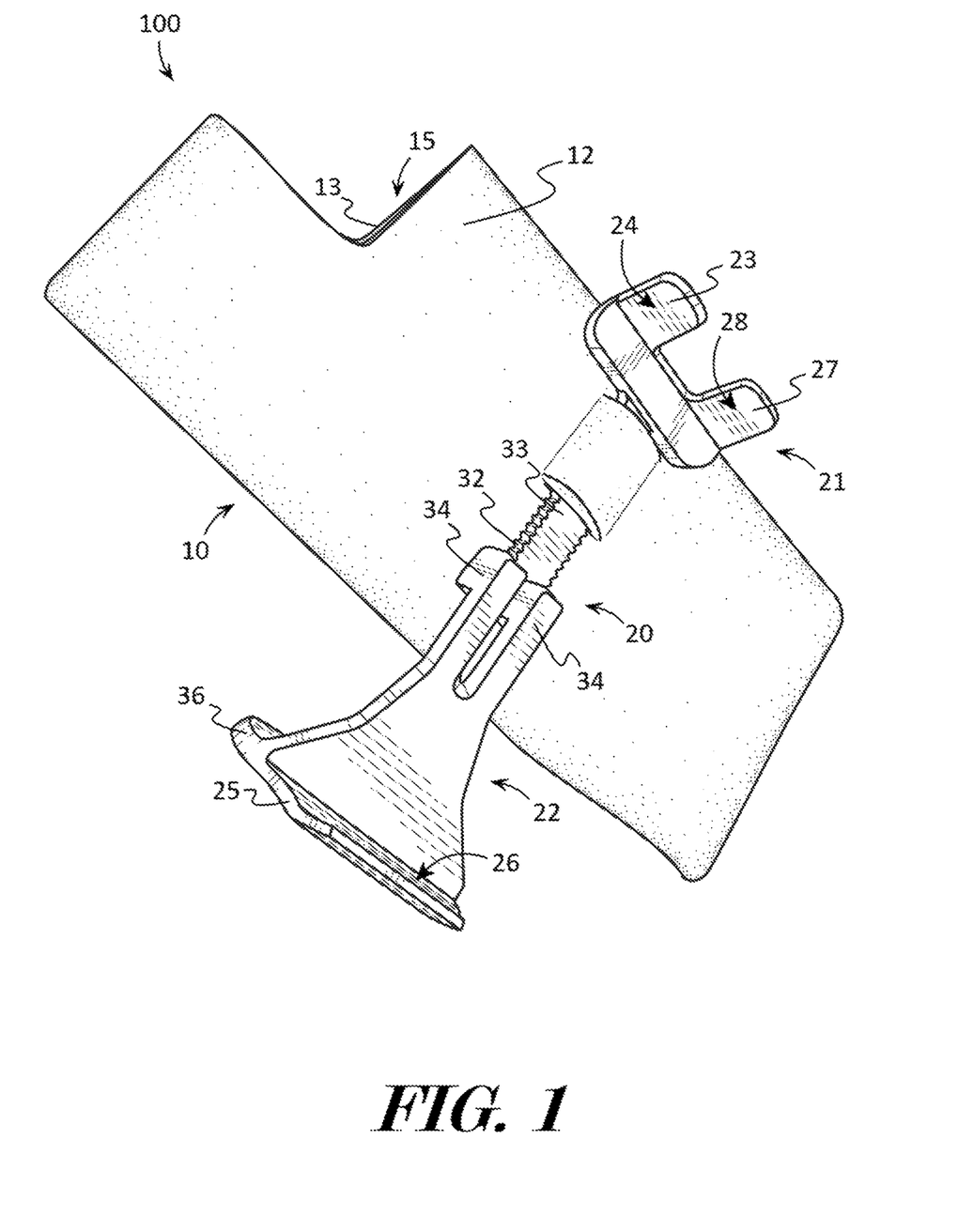
FIG. 1-FIG. 1 depicts a perspective view of an example of an eyewear storage device according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

A new device configured to store eyewear and to secure the eyewear to other objects is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. FIGS. 1, 2, 7-9 illustrate examples of an eyewear storage device ("the device") 100 according to various embodiments. In some embodiments, the device 100 may comprise a receptacle 10 which may be coupled to a receiver 21. The receptacle 10 may comprise a cavity 11 for receiving portions of an article of eyewear 200, such as such as vision correcting eyeglasses, sunglasses, safety glasses, and any other vision correcting or enhancing device. Preferably, the receptacle 10 may comprise a cutout 15 which may allow the receptacle 10 to have a cavity 11 that, unlike traditional eyeglass holders' cavities, has a cut away to allow the cell phone camera lens of a cell phone or other electronic device type object 300 to have an unobstructed view while the receiver 20 is attached to the cell phone or other electronic device type object 300. The receiver 20 may comprise a first arm 21 which may be coupled to a second arm 22. The first arm 21 may have a first finger 23, and the first finger 23 may have a first finger gripping surface 24. The second arm 22 may have a base 25, and the base 25 may have a base gripping surface 26. The first arm 21 may be movably coupled to the second arm 22 so that the first finger gripping surface 24 and the base gripping surface 26 may be movable towards and away from each other. Preferably, the first finger gripping surface 24 and the base gripping surface 26 may be positioned on opposing sides or surfaces of an object 300, such as a cell phone, and the first arm 21 and the second arm 22 may be moved towards each other so that the first finger gripping surface 24 and the base gripping surface 26 are contacting and tensioned against the opposing sides or surfaces of the object 300 so that the receiver 20 may grip the object. In this manner the receptacle 10 that is coupled to the receiver 20 may be coupled to the object 300 so a user may use the cavity 11 to removably secure an article of eyewear 200 to the object 300.

Figure 3:
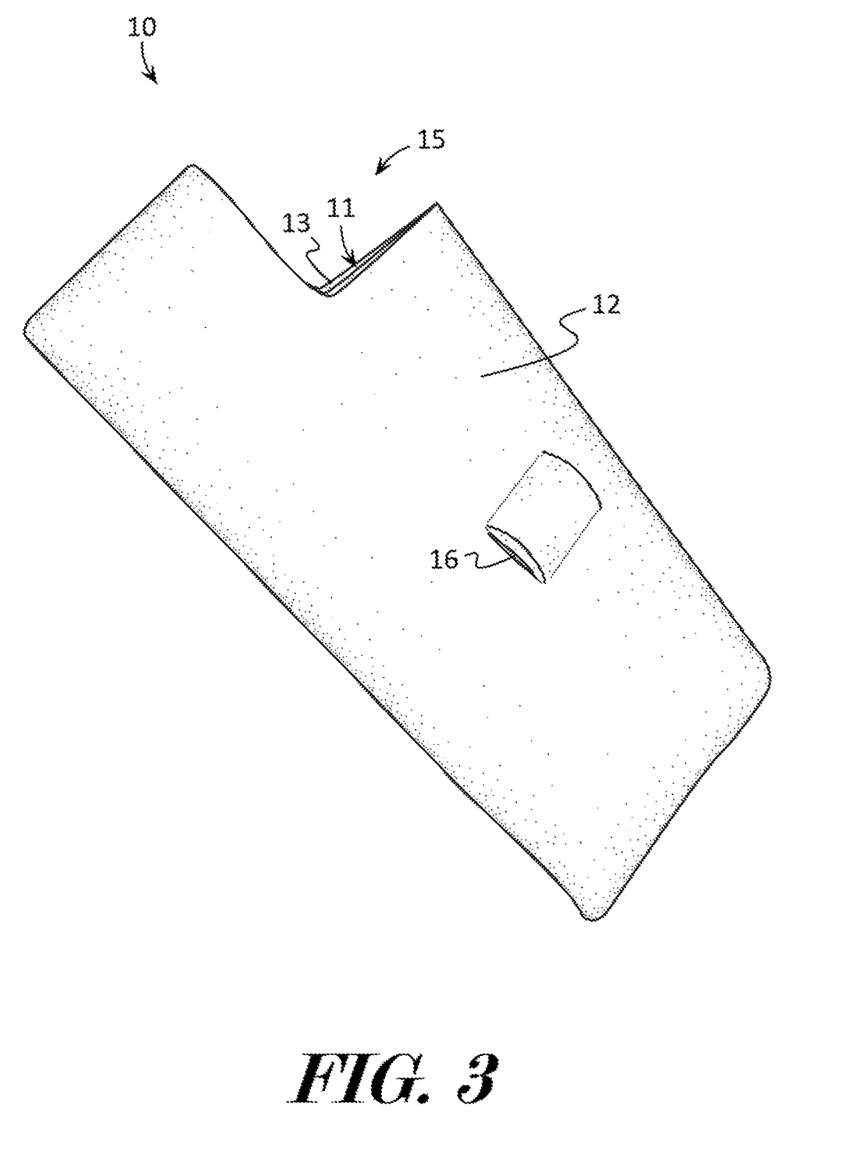
FIG. 3-FIG. 3 shows a perspective view of an example of a receptacle according to various embodiments described herein.

The device 100 may comprise one or more receptacles 10. Generally, a receptacle 10 may be configured to secure and/or be removably coupled to an article of eyewear 200. In preferred embodiments, a receptacle 10 may comprise one or more cavities 11 into which all or portions of an article of eyewear 200 may be inserted or received. A receptacle 10 and its one or more cavities 11 may be configured in any size and shape. Optionally, a receptacle 10 may comprise a strap, clasp, snap-type fastener, or any other fastener, which may be configured to govern the ability of an article of eyewear 200 to be inserted and/or removed from the cavity 11.

In some embodiments, a receptacle 10 may comprise one or more walls, such as a first wall 12 and a second wall 13, which may be coupled together to form all or portions of a cavity 11. Walls 12, 13, may be configured in any size and shape. In preferred embodiments, a receptacle 10 may comprise a first wall 12 and a second wall 13 which may be generally rectangular in shape and which may be coupled together along all or portions of three sides of their rectangular shape to form a cavity 11 between the walls 12, 13. The fourth side may then form an opening to the cavity 11 into which an article of eyewear 200 may be inserted into and removed from. Optionally, a receptacle 10 may comprise a cutout 15 which may be formed or cut into the walls 12, 13, and which may decrease the size and shape of the walls 12, 13, and cavity 11 so as to allow portions of an article of eyewear 200, such as a temple 201, to remain out of the cavity 11 when other portions the article of eyewear 200 are received in the cavity 11. In preferred embodiments, a cutout 15 may be shaped and positioned in one or more walls 12, 13, to allow for the camera lens of a cell phone or other electronic device type object 300 to take a picture and to have unobstructed viewing while the receiver 20 is attached to the phone or other electronic device type object 300. Preferably, the user may remove their glasses or article of eyewear 200 from the cavity 11 of the receptacle 10 when they desire to take a picture, and the cutouts 15 on the one or more walls 12, 13 may allow the camera lens to have an unobstructed view so that the cell phone or other electronic device type object 300 does not need to be separated from the receiver 20. One or more cutouts 15 may be positioned anywhere on the receptacle 10 to correspond with the camera location of any cell phone or other electronic device type object 300.

A receptacle 10 may be made from and/or may comprise any material. In some embodiments, a receptacle 10 may be made from and/or may comprise a flexible material, such as various types of flexible plastics including polyvinyl chloride, natural or synthetic rubber, synthetic fabrics such as polyester, acrylic, nylon, rayon, acetate, spandex, spandex blends, and Kevlar, and natural fabrics such as coir, cotton, hemp, jute, canvas, flax, leather, linen, ramie, wool, silk, or any other suitable flexible natural or synthetic material including combinations of materials. In preferred embodiments, a receptacle 10 may comprise a flexible material that may be an elastic material. Example elastic materials include spandex, spandex blends, neoprene, elastane, other elastic fabrics, such as woven elastic fabrics and knitted elastic fabrics, rubber, silicone rubber, elastic plastics, elastic silicone, elastic rubbers, silicone rubbers, or any other suitable elastic, elastomer, or any other material or combination or materials that are substantially able to regain their shape after deformation.

In further preferred embodiments, the receptacle 10 may be made from an elastic material so that the elastic material bounds and forms the cavity 11. For example, the receptacle 10 may comprise a first wall 12 and a second wall 13 which may be coupled together to form a cavity 11, and the walls 12, 13, may each be made from an elastic material, such as neoprene, so that the cavity 11 is bounded and formed by the elastic material of the walls 12, 13. In further embodiments, the walls 12, 13, of the receptacle 10 may comprise a flexible material and an elastic material so that the flexible material bounds and forms the cavity 11. For example, the receptacle 10 may comprise a first wall 12 and a second wall 13 which may be coupled together to form a cavity 11, and the walls 12, 13, may each be comprise an elastic material, such as neoprene, and a flexible material, such as rayon fabric, so that the cavity 11 is bounded and formed by the rayon fabric of the walls 12, 13, while still allowing the walls 12, 13, to be resilient or stretchy so as to regain their shape after deformation.

Figure 2:
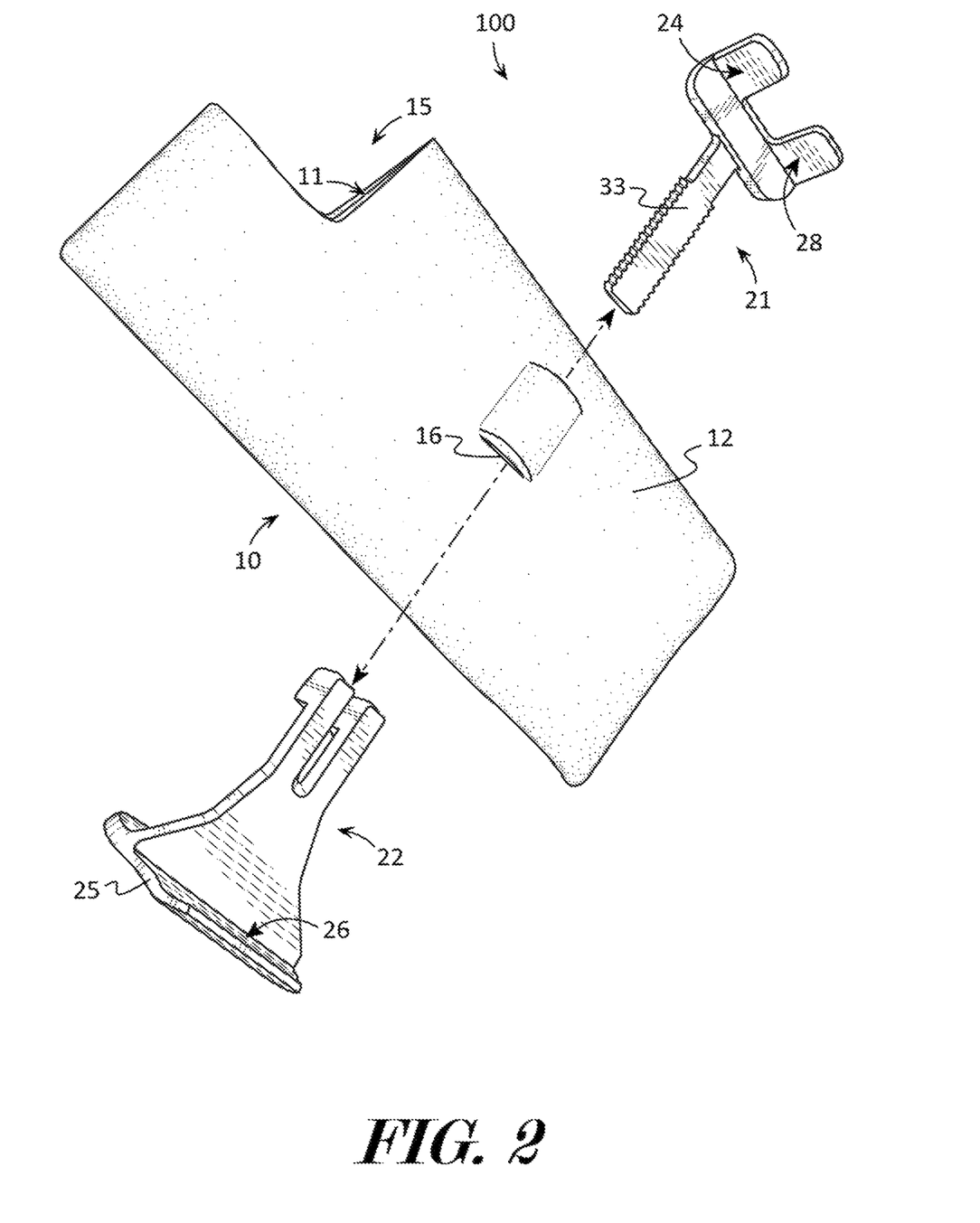
FIG. 2-FIG. 2 illustrates a perspective exploded view of an example of an eyewear storage device according to various embodiments described herein.

A receptacle 10 and a receiver 20 may be coupled together with any suitable coupling method. In preferred embodiments, a receptacle 10 and a receiver 20 may be coupled together via heat welding, such as via heat staking. Heat Staking is a pulsed-heat process to join two or more parts out of which one at least is made of plastic. The process is to deform the plastic material using heat and force at a set process time. The bond is made by partially de-forming the plastic part in order to fix the other. For example, a receiver 20 may comprise one or more plastic studs which may be inserted through portions of a wall 12, 13, and which may be heated and deformed so that the studs may no longer be shaped to be able to be removed or separated from the wall 12, 13. In further embodiments, a receiver 20 may be coupled to a receptacle 10 via a portion of the receiver 20 being inserted through a portion of the receptacle 10. For example, a receptacle 10 may comprise one or more receiver apertures 16, preferably formed or cut into a wall 12, 13, and a portion of the receiver 20, such as a portion of the plate 33, may be inserted through the receiver apertures 16.

The device 100 may comprise one or more receivers 20. Generally, a receiver 20 may be configured to secure and/or be removably coupled to an object 300, such as a cell phone or smartphone, tablet computer, other electronic devices, a chair, a dashboard, or any other object. In preferred embodiments, a receiver 20 may comprise a first 21 and second 22 arm which may each have one or more surfaces which may be tensioned against opposing sides of an object so that the arms 21, 22, may generally grip the object 300 in order to couple the device 100 to the object 300.

In some embodiments, a first arm 21 may comprise one or more fingers, such as a first finger 23 and a second finger 27. Generally, a finger 23, 27, may form a portion of the first arm 21 which may be configured to contact and grip portions of an object that the receiver 20 may secure and/or be removably coupled to.

In preferred embodiments, each finger 23, 27, may comprise one or more finger gripping surfaces 24, 28. For example, a first finger 23 may comprise one or more first finger gripping surfaces 24, and a second finger 27 may comprise one or more second finger gripping surfaces 28. Finger gripping surfaces 24, 28, may be configured in any shape and size.

Figure 4A:
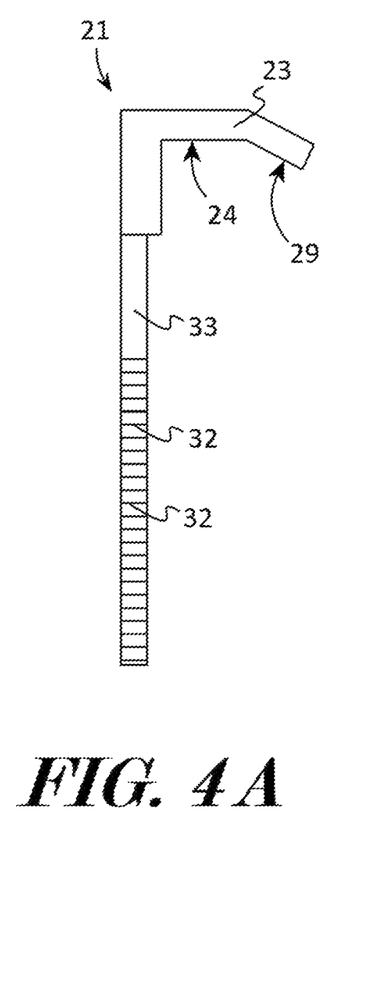
FIG. 4A-FIG. 4A depicts a first side elevation view of an example of a first arm of a receiver according to various embodiments described herein.
Figure 4B:
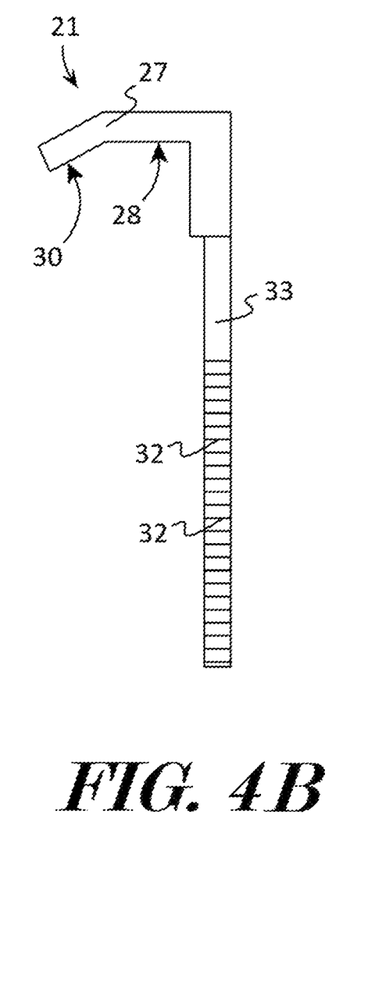
FIG. 4B-FIG. 4B illustrates a second side elevation view of an example of a first arm of a receiver according to various embodiments described herein.

In further embodiments, each finger 23, 27, may comprise one or more finger bevel surfaces 29, 30. For example, a first finger 23 may comprise one or more first finger bevel surfaces 29, and a second finger 27 may comprise one or more second finger bevel surfaces 30 as perhaps best shown in FIGS. 4A and 4B. Generally, a finger bevel surface 29, 30, may be angled, curved, or otherwise positioned in a different plane than a finger gripping surface 24, 28, so that the finger bevel surface 29, 30, may contact a different portion of an object than a finger gripping surface 24, 28. For example, a first arm 21 may comprise a first finger gripping surface 24 and a first finger bevel surface 29, and the first finger bevel surface 29 may be angled relative to the first finger gripping surface 24. Likewise, a second arm 22 may comprise a second finger gripping surface 28 and a second finger bevel surface 30, and the second finger bevel surface 30 may be angled relative to the second finger gripping surface 28. In preferred embodiments, a finger bevel surface 29, 30, may be angled between approximately 0.1 to 45 degrees relative to a finger gripping surface 24, 28, (with 90 degrees describing the finger bevel surface 29, 30, being generally perpendicular to the finger gripping surface 24, 28).

In some embodiments, a second arm 22 may comprise one or more bases 25. Generally, a base 25, may form a portion of the second arm 22 which may be configured to contact and grip portions of an object that the receiver 20 may secure and/or be removably coupled to. It should be understood that a base 25 and a finger 23, 27, may be configured in any shape and size, and that the term "base" and "finger" may be substituted for each other. For example, the device 100 may comprise two bases 25 which may be configured/function as a first 23 and second 27 finger, and one finger 23 that may be configured/function as a base 25.

In preferred embodiments, each base 25 may comprise one or more base gripping surfaces 26. A base 25 may be configured in any size and shape to accommodate one or more base gripping surfaces 26. For example, a base 25 may comprise one, two, three, four, or more base gripping surfaces 26. Similar to finger gripping surfaces 24, 28, base gripping surfaces 26 may be configured in any shape and size. Optionally, second arm 22 may comprise a base projection 35 which may extend away, preferably approximately perpendicularly, from a base 25.

Figure 5:
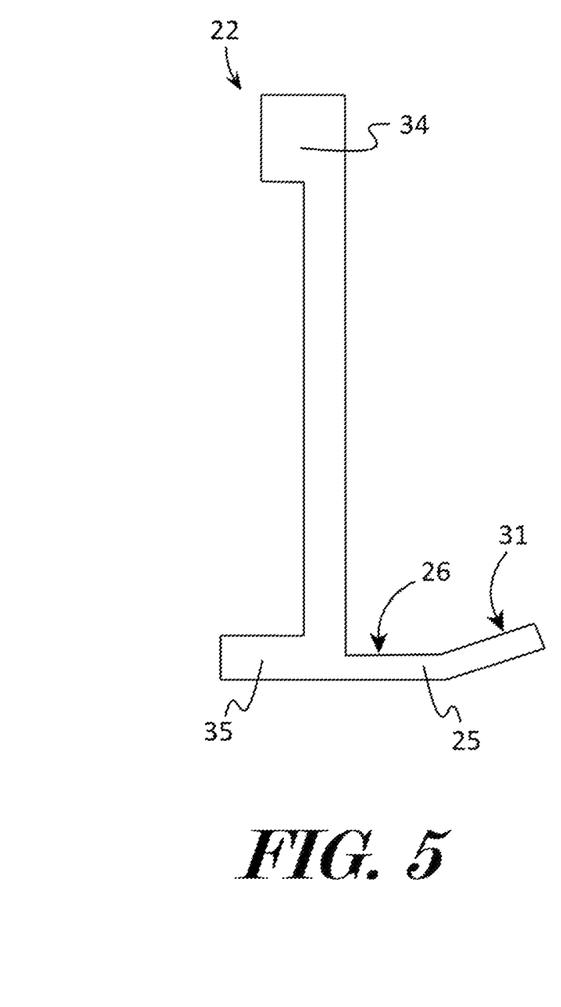
FIG. 5-FIG. 5 shows a side elevation view of an example of a second arm of a receiver according to various embodiments described herein.

In further embodiments, a base 25 may comprise one or more base bevel surfaces 31 as perhaps best shown in FIG. 5. Generally, a base bevel surface 31 may be angled, curved, or otherwise positioned in a different plane than a base gripping surface 26 so that the base bevel surface 31 may contact a different portion of an object than the base gripping surface 26. For example, a base 25 may comprise a first base gripping surface 26 and a first base bevel surface 31, and the first base bevel surface 31 may be angled relative to the first base gripping surface 26. In preferred embodiments, a base bevel surface 31 may be angled between approximately 0.1 to 45 degrees relative to a base gripping surface 26 (with 90 degrees describing the base bevel surface 31 being generally perpendicular to the base gripping surface 26).

The surfaces 24, 26, 28, 29, 30, 31, may be made from and/or may comprise any material. In preferred embodiments, one or more surfaces 24, 26, 28, 29, 30, 31, may be made from and/or may comprise a resilient material. Generally, a resilient material when placed into contact with another material may contribute to a relatively high friction of coefficient between the resilient material and the other material. Preferably, a resilient material may be a natural and/or synthetic material, which is flexible to allow slight deformation and resilient so as to return to its original shape after deformation. Example resilient materials include latex rubber, silicone rubber, forms of the organic compound isoprene, such as polyisoprene, Butyl rubber, Polyacrylate Rubber, Ethylene-acrylate Rubber, Polyester Urethane, Bromo Isobutylene Isoprene, Polybutadiene, Chloro Isobutylene Isoprene, Polychloroprene, Chlorosulphonated Polyethylene, Epichlorohydrin, Ethylene Propylene, Ethylene Propylene Diene Monomer, Polyether Urethane, Perfluorocarbon Rubber, Fluoronated Hydrocarbon, Fluoro Silicone, Fluorocarbon Rubber, Hydrogenated Nitrile Butadiene, Polyisoprene, Isobutylene Isoprene Butyl, Acrylonitrile Butadiene, Polyurethane, Styrene Butadiene, Styrene Ethylene Butylene Styrene Copolymer, Polysiloxane, Vinyl Methyl Silicone, Acrylonitrile Butadiene Carboxy Monomer, Styrene Butadiene Carboxy Monomer, Thermoplastic Polyether-ester, Styrene Butadiene Block Copolymer, and Styrene Butadiene Carboxy Block Copolymer. In further embodiments, one or more surfaces 24, 26, 28, 29, 30, 31, may be made from and/or may comprise any material which when placed into contact with another material may contribute to a friction of coefficient greater than 0.3, and more preferably greater than 0.5, between the material of the one or more surfaces 24, 26, 28, 29, 30, 31, and the other material.

In preferred embodiments, one or more elements and/or surfaces of the device 100 may be made from or may comprise one or more bioplastics. Bioplastics are plastic materials produced from renewable biomass sources, such as vegetable fats and oils, corn starch, straw, woodchips, sawdust, recycled food waste, etc. Any suitable bioplastic material may be used, such as: Starch-based plastics; Cellulose-based plastics; Protein-based plastics; aliphatic polyesters; Polyhydroxyalkanoates; Polyamide 11; Bio-derived polyethylene; Genetically modified feedstocks; Polyhydroxyurethanes; and Lipid derived polymers. Preferably, one or more elements or surfaces of the device 100 may be made from or may comprise Soy protein based biodegradable plastics.

In preferred embodiments, base(s) 25 and/or finger(s) 23, 27, may comprise a flexible material which may enable portions of one or more of the base surfaces 26, 31, and/or finger 23, 27, surfaces 24, 28, 29, 30, to bend or flex relative to the arm 21, 22, that they are disposed on or coupled to. Preferably, a flexible material may comprise a natural and/or synthetic rubber or polymer material, which is flexible to allow slight deformation and resilient so as to return to its original shape after deformation. Natural rubber materials may include latex rubber, forms of the organic compound isoprene, such as polyisoprene, and the like. Synthetic rubber materials may include Polyacrylate Rubber, Ethylene-acrylate Rubber, Polyester Urethane, Bromo Isobutylene Isoprene, Polybutadiene, Chloro Isobutylene Isoprene, Polychloroprene, Chlorosulphonated Polyethylene, Epichlorohydrin, Ethylene Propylene, Ethylene Propylene Diene Monomer, Polyether Urethane, Perfluorocarbon Rubber, Fluoronated Hydrocarbon, Fluoro Silicone, Fluorocarbon Rubber, Hydrogenated Nitrile Butadiene, Polyisoprene, Isobutylene Isoprene Butyl, Acrylonitrile Butadiene, Polyurethane, Styrene Butadiene, Styrene Ethylene Butylene Styrene Copolymer, Polysiloxane, Vinyl Methyl Silicone, Acrylonitrile Butadiene Carboxy Monomer, Styrene Butadiene Carboxy Monomer, Thermoplastic Polyether-ester, Styrene Butadiene Block Copolymer, Styrene Butadiene Carboxy Block Copolymer, and the like. In other embodiments, a flexible material may comprise a flexible polymer such as polytetrafluoroethylene (PTFE), polyethylene terephthalate (PET), high-density polyethylene (HDPE), polyvinyl chloride (PVC), polypropylene (PP), Polystyrene (PS), Polycarbonate (PC), low density polyethylene (LDPE), Polyoxymethylene (POM), Acrylonitrile butadiene styrene (ABS), Polyethylene/Acrylonitrile Butadiene Styrene (PE/ABS), Polycarbonate/Acrylonitrile Butadiene Styrene (PC/ABS), Ultra High Molecular Weight polyethylene, Polyurethanes (PU), Polyamides (PA), or any other suitable flexible natural or synthetic material including combinations of materials, which is flexible to allow slight deformation and resilient so as to return to its original shape after deformation. In other embodiments, base(s) 25 and/or finger(s) 23, 27, may comprise any other material(s) which may structurally support the surfaces 24, 26, 28, 29, 30, 31, of the device 100.

Figure 6A:
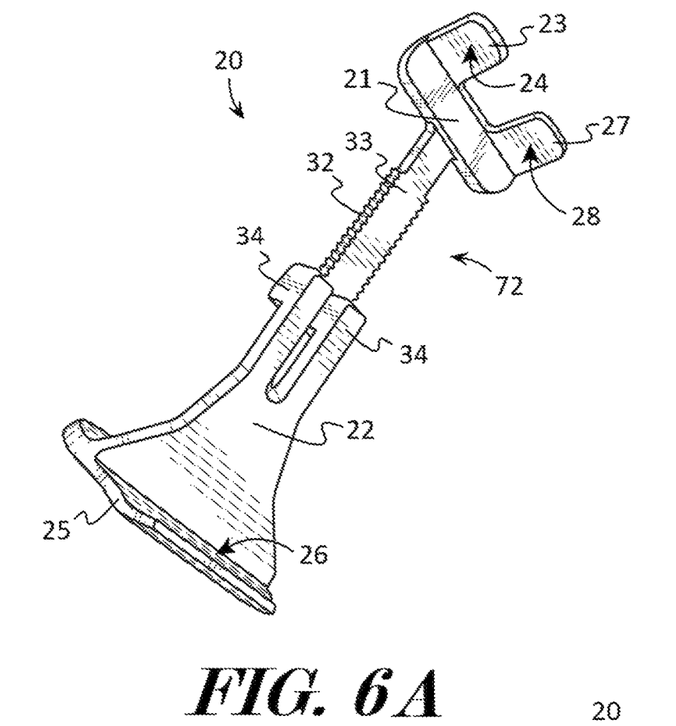
FIG. 6A-FIG. 6A depicts a perspective view of an example of a receiver in a second position according to various embodiments described herein.
Figure 6B:
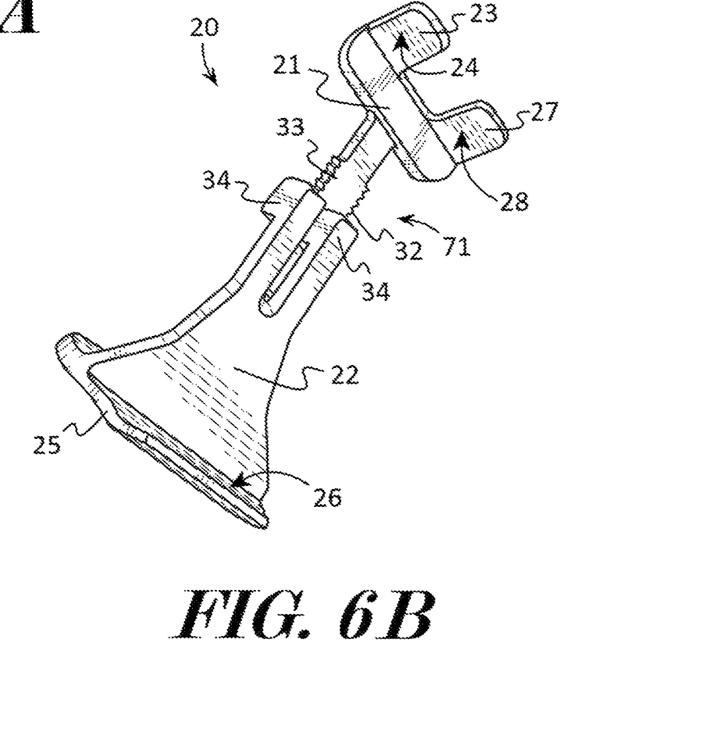
FIG. 6B-FIG. 6B illustrates a perspective view of an example of a receiver in a first position according to various embodiments described herein.
Figure 7:
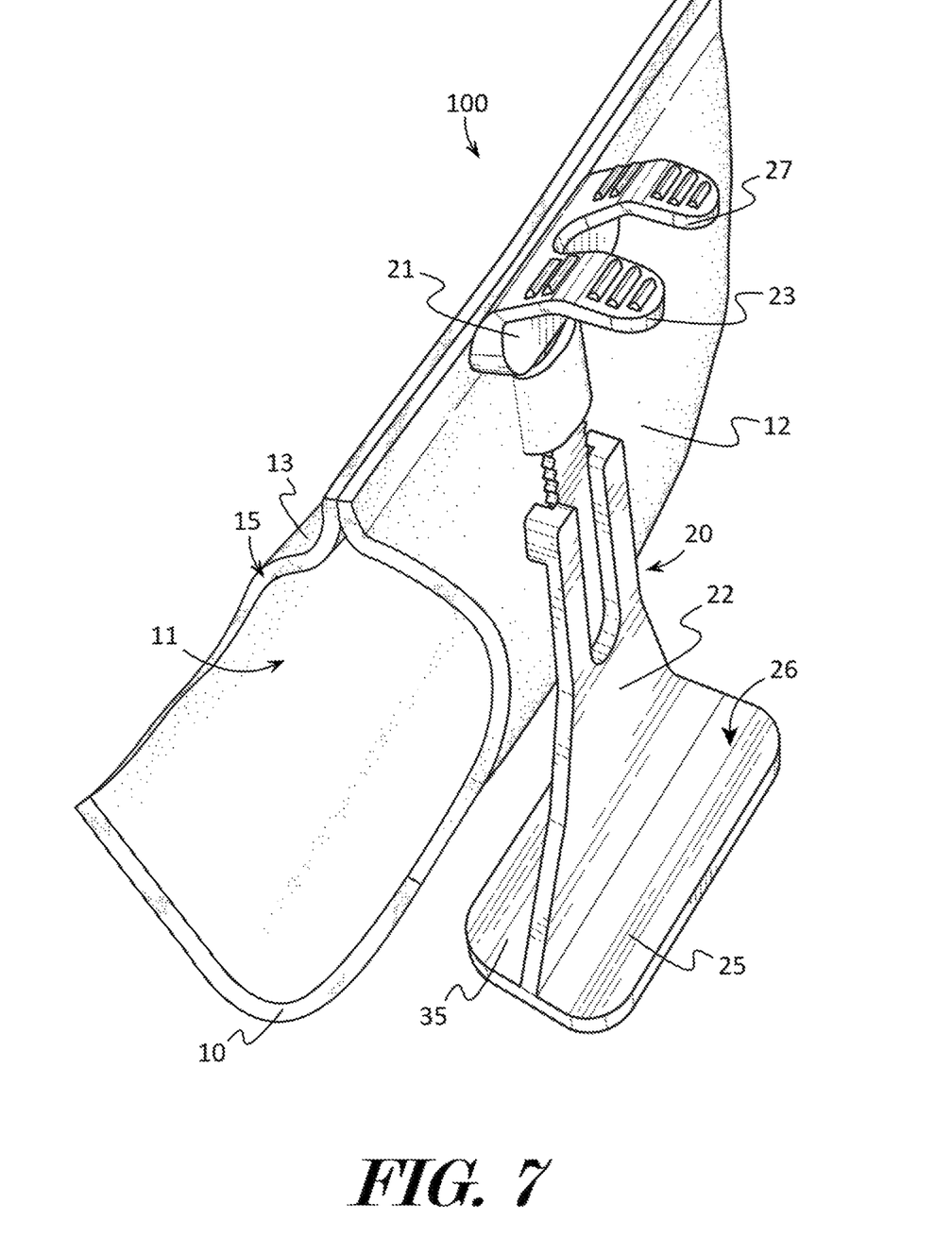
FIG. 7-FIG. 7 shows a perspective view of an example of an eyewear storage device according to various embodiments described herein.
Figure 8:
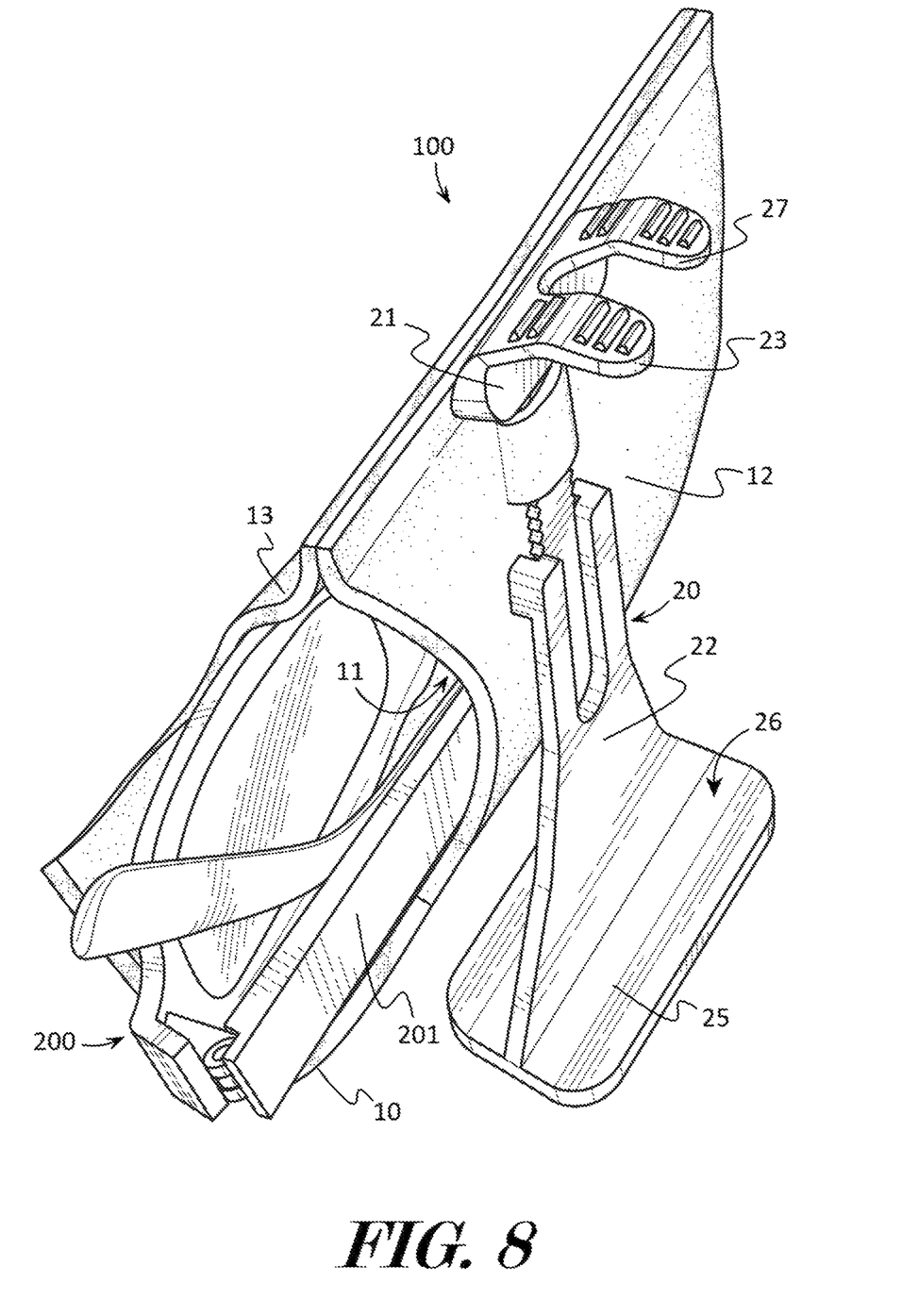
FIG. 8-FIG. 8 depicts a perspective view of an example of an article of eyewear received the cavity of an exemplary eyewear storage device according to various embodiments described herein.
Figure 9:
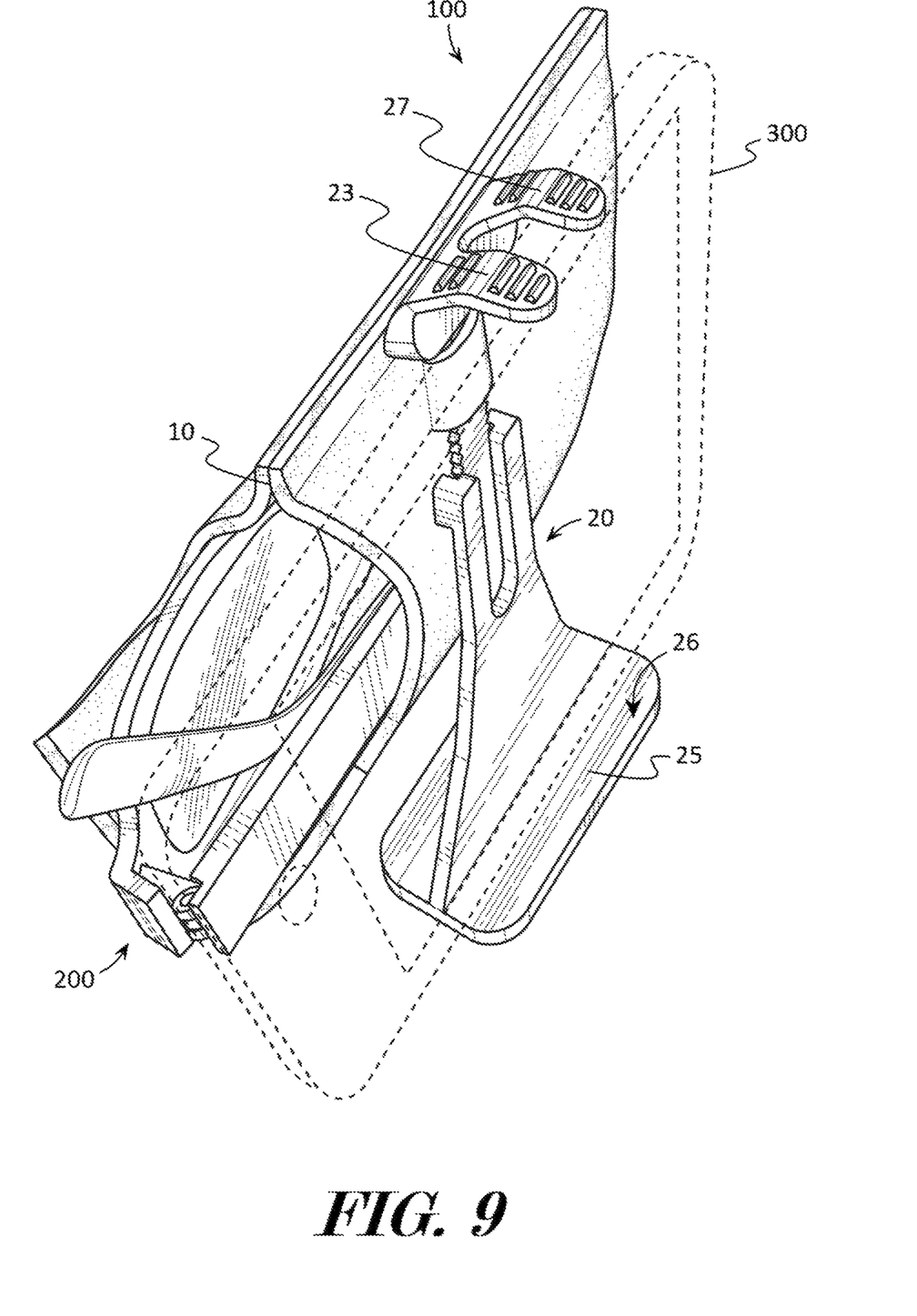
FIG. 9-FIG. 9 illustrates a perspective view of an exemplary eyewear storage device having an example of an article of eyewear received the cavity and an exemplary object (shown with dashed lines) coupled to the receiver of according to various embodiments described herein.

A first arm 21 and a second arm 22 may be coupled together with any suitable coupling method. In preferred embodiments, a first arm 21 and a second arm 22 may be coupled together with any suitable movable coupling method so that the base(s) 25 and finger(s) 23, 27, may be movable relative to each other, such as between a first position 71 (FIG. 6B) and a second position 72 (FIG. 6A). In a first position 71, the surfaces 24, 26, 28, 29, 30, 31, of the base(s) 25 and finger(s) 23, 27, may be positioned relatively closer together, while in a second position 72, the surfaces 24, 26, 28, 29, 30, 31, of the base(s) 25 and finger(s) 23, 27, may be positioned relatively farther apart. In further preferred embodiments, a first arm 21 and a second arm 22 may be movably coupled together so that at least one finger surface 24, 28, 29, 30, is movable between 0.2 inches and 10 inches relative to at least one base surface 26, 31. In further preferred embodiments, a first arm 21 and a second arm 22 may be movably coupled together so that at least one finger surface 24, 28, 29, 30, is movable between 2 inches and 10 inches relative to at least one base surface 26, 31.

In some embodiments, the receiver 20 may comprise a plurality of teeth 32, and the positioning of at least one finger surface 24, 28, 29, 30, relative to at least one base surface 26, 31, may be governed by the positioning of the teeth 32. In further embodiments, a first arm 21 may comprise a plurality, such as two, three, four, five, six, seven, eight, nine, ten, fifteen, twenty-five, fifty, or any other number greater than one, of teeth 32 which may be positioned on the first arm 21, such as on a plate 33. Teeth 32 may comprise protrusions of any shape and size which may extend away from the plate 33.

In some embodiments, a second arm 22 may comprise one or more plate retainers 34 which may movably receive portions of the plate 33 so that the teeth 32 may function as stops for controlling the positioning of the plate 33 received by the plate retainers 34. Generally, a tooth 32 or the space between two adjacent teeth 32 may be contacted by one or more plate retainers 34 to arrest the tooth 32 or the space between two adjacent teeth 32, and therefore arrest the positioning of the arms 21, 22, and their respective surfaces 24, 26, 28, 29, 30, 31, relative to each other. In further embodiments, one or more plate retainers 34 may be made from a flexible material so that they may flex slightly to allow the teeth 32 to slide between the plate retainers 34 for repositioning purposes while also resisting being flexed to maintain desired teeth 32 between the plate retainers 34.

In alternative embodiments, a first arm 21 and second arm 22 may be movably coupled together via threading, a positionable gas piston, one or more threaded fasteners or other removable fasteners, a push-to-lock type connection method, a turn-to-lock type connection method, or any other movably coupling method which may allow the arms 21, 22, and their respective surfaces 24, 26, 28, 29, 30, 31, to be repositioned relative to each other.

While some exemplary shapes and sizes have been provided for elements of the device 100, it should be understood to one of ordinary skill in the art that the receptacle 10, receiver 20, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the device 100 may be made from and/or may comprise durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or may comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An eyewear storage device, the device comprising:
a receptacle, the receptacle comprising a first wall and a second wall that are coupled together to form a cavity having an opening for receiving portions of an eyewear;
a receiver coupled to the receptacle, the receiver comprising a first arm coupled to a second arm, the first arm having a first finger, and the first finger having a first finger gripping surface, the second arm having a base, and the base having a base gripping surface, wherein the first arm is movably coupled to the second arm so that the first finger gripping surface and the base gripping surface are movable towards and away from each other;
a cutout formed into the first wall and second wall of the receptacle, the cutout contiguous with the opening, the cutout configured to prevent the receptacle from covering portions of an electronic device type object while the receiver is attached to the electronic device type object; and
wherein the second arm comprises a base projection that extends perpendicularly away from the base.

2. The device of claim 1, wherein the first arm further comprises a second finger.

3. The device of claim 1, wherein the first finger comprises a finger bevel surface, and wherein the finger bevel surface is angled relative to the first finger gripping surface.

4. The device of claim 1, wherein the base comprises a base bevel surface, and wherein the base bevel surface is angled between 5 and 20 degrees relative to the base gripping surface.

5. The device of claim 1, wherein the receptacle comprises an elastic material.

6. The device of claim 1, wherein the receptacle is made from an elastic material, and wherein the elastic material bounds and forms the cavity.

7. The device of claim 1, wherein the receiver is coupled to the receptacle via heat welding.

8. The device of claim 1, wherein the receiver is coupled to the receptacle via a portion of the receiver being inserted through a portion of the receptacle.

9. The device of claim 1, wherein the receiver comprises a plurality of teeth, and wherein the positioning of the first finger gripping surface relative to the base gripping surface is governed by the positioning of the teeth between a first plate retainer and a second plate retainer.

10. The device of claim 1, wherein a surface comprises a resilient material, the surface selected from the group consisting of the first finger gripping surface and the base gripping surface.

11. An eyewear storage device, the device comprising:
a receptacle, the receptacle comprising a first wall and a second wall that are coupled together to form a cavity having an opening for receiving portions of an eyewear, wherein the first wall and second wall are made from an elastic material;
a receiver coupled to the receptacle, the receiver comprising a first arm coupled to a second arm, the first arm having a first finger, and the first finger having a first finger gripping surface, the second arm having a base and a base projection that extends perpendicularly away from the base, and the base having a base gripping surface, wherein the first arm is movably coupled to the second arm so that the first finger gripping surface and the base gripping surface are movable towards and away from each other, wherein the receiver comprises a plurality of teeth, and wherein the positioning of the first finger gripping surface relative to the base gripping surface is governed by the positioning of the teeth between a first plate retainer and a second plate retainer; and
a cutout formed into the first wall and second wall of the receptacle, the cutout contiguous with the opening, the cutout configured to prevent the receptacle from covering portions of an electronic device type object while the receiver is attached to the electronic device type object.

12. The device of claim 11, wherein the first finger gripping surface and the base gripping surface are movable between two inches and five inches from each other.

13. The device of claim 11, wherein the first arm further comprises a second finger.

14. The device of claim 11, wherein the first finger comprises a finger bevel surface, and wherein the finger bevel surface is angled relative to the first finger gripping surface.

15. The device of claim 11, wherein the base comprises a base bevel surface, and wherein the base bevel surface is angled between 5 and 20 degrees relative to the base gripping surface.

16. The device of claim 11, wherein the receptacle comprises an elastic material.

17. The device of claim 11, wherein the receiver is coupled to the receptacle via heat welding.

18. The device of claim 11, wherein the receiver is coupled to the receptacle via a portion of the receiver being inserted through a portion of the receptacle.

19. The device of claim 11, wherein a surface comprises a resilient material, the surface selected from the group consisting of the first finger gripping surface and the base gripping surface.

* * * * *